United States Patent [19]  [11]  4,093,015
Malinski  [45]  June 6, 1978

[54] METHOD OF MOUNTING LARGE PNEUMATIC TIRES

[76] Inventor: S. W. Malinski, P.O. Box 161, Tamaroa, Ill. 62888

[21] Appl. No.: 809,278

[22] Filed: Jun. 23, 1977

[51] Int. Cl.² .......................................... B60C 25/06
[52] U.S. Cl. .................................................. 157/1.1
[58] Field of Search ............................. 157/1.1, 1.17

[56] References Cited

U.S. PATENT DOCUMENTS

| | | | |
|---|---|---|---|
| 3,489,198 | 1/1970 | Malinski | 157/1.17 |
| 3,612,140 | 10/1971 | Malinski | 157/1.17 |
| 4,014,375 | 3/1977 | Malinski et al. | 157/1.17 |
| 4,031,941 | 6/1977 | Malinski et al. | 157/1.17 |

*Primary Examiner*—James L. Jones, Jr.
*Assistant Examiner*—James G. Smith

[57] ABSTRACT

Large pneumatic tires of the class known as "as earth mover" tires were originally proportioned for use on that type of wheel rim with a removable flange. As adapted for use with drop center rims, their large beads may not fit simultaneously within the drop center rim portion. Utilizing mounting equipment having concentric counter-rotating bead deflectors, no problem is encountered as to mounting the lower bead, which tends to stay at least partly in the drop center; however, this holds the upper bead elevated and interferes with inserting a starting portion of the upper bead therein. In the present method a starting portion of the upper bead is thrust sharply downward below the upper flange of the rim into the drop center; and the bead deflectors are counter-rotated for approximately one-third of their semicircular arcs. The horizontal thrust component is increased to shift more of the upper sidewall beyond center of the rim, to exert tension on the bead which permits the bed deflectors to move through approximately the second one-third of their arcs of travel. Then on raising the point of the thrust, the tire casing rotates sufficiently to draw the lower bead fully out of the drop center at the point of thrust, permitting the upper bead portion to drop fully into the drop center. This allows the upper sidewall to shift farther beyond center, to permit the bead deflectors to work over the remainder of their arcs.

2 Claims, 6 Drawing Figures

METHOD OF MOUNTING LARGE PNEUMATIC TIRES

BACKGROUND OF THE INVENTION

U.S. Pat. No. 3,489,198 discloses a method of mounting and removing large-sized pneumatic tires on drop center rims by moving a pair of bead deflectors in opposite senses about the rim flange commencing at a point at which a thrust force is applied partly inward against the tire tread. This patent also discloses apparatus including a platform on which a rim is held horizontal, and side-by-side shafts projecting upward through the periphery of the rim, between the bead to be deflected and the rim, in opposite 180° arcs. Since the bead deflectors were on telescoping arms projecting from non-concentric shafts and would bear against the rim edge, much friction accompanied their movement, limiting the capacity of the machine.

Since that patent was applied for, much larger and wider pneumatic tires have been manufactured for carrying extremely heavy loads, and the tire beads and rim bead seat portions have been standardized. The beads are often so large as not to fit readily adjacent to each other within the drop center portion of a drop center rim. It may be impossible to have both of the tire beads fully within the drop center portion at the same time. After the lower bead of the tire has been deflected over the upper flange of a horizontally-held rim, the lower bead will tend to remain at least in part in the drop center, holding the upper bead above the upper rim flange. Before air pressure is applied within the tire, there is no feasible way to drive a lower tire bead onto its bead seat and fully out of the drop center. Thus the lower bead interferes with mounting the upper bead. This factor, unless overcome, would deter use of drop center rims for these heavy tires with large beads.

These problems of mounting the upper tire bead have been identified:

1. While the lower bead is resting on the wall portion which leads from the drop center to the lower bead seating surface and occupies at least part of the drop center, it holds the upper bead high above the upper flange of the rim, requiring an initial sharp downward deflection to tuck a starting portion of the upper bead beneath the rim flange. Applying such an initial sharp downward force is inconsistent with applying a horizontal or transverse shifting of the tire sidewall, as taught in U.S. Pat. No. 3,489,198.

2. The presence of at least a part of the lower bead in the drop center interferes with the full entry of the upper bead into the drop center, as required for maximum transverse shifting.

These difficulties relate only to mounting the upper bead; when the lower bead enters the drop center nothing there interferes with it; it may be mounted as set forth in my U.S. Pat. No. 3,489,198.

FIELD OF THE INVENTION

This invention relates to an improved method for mounting large-sized pneumatic tires, such as are used for mine vehicles and the like, on one-piece drop center rims; and represents an improvement on the method of my U.S. Pat. No. 3,489,198.

SUMMARY OF THE INVENTION

To overcome these problems, I have developed an improved method of mounting pneumatic tires by the use of that type of tire mounting machine which employs two counter-rotating bead deflectors, rotated on concentric shafts at the center of the rim about its upper flange through nearly semicircular arcs of travel in opposite senses. In this method, I preferably mount the lower tire bead utilizing the procedure described in my said U.S. Pat. No. 3,489,198. This leaves the lower tire bead at least partly resting on the sloping wall which leads from the drop center to the lower bead seating surface. At this stage, I employ the following steps:

First, I position the two bead deflectors adjacent to each other at the point along the circumference of the rim near which the thrust force will be applied to the tire being mounted. Then I apply, radially outward of this point, against a localized area of the tread of the tire adjacent to its upper sidewall, a thrust force having a radial horizontal component but also having a strong downward component sufficient to thrust a starting portion of the upper bead, immediately inward of the localized tread area where the thrust force is applied, downward below the upper flange of the rim and at least partly into the drop center. Holding this starting bead portion in place, FIG. 4, I then commence the counter-rotation of the bead deflectors to deflect the upper bead from above to below the upper rim flange, in an arc widening progressively from the initially selected point of their application through about 60° of travel, that is, substantially the first one-third of the arcs of travel of the bead deflectors. At this stage, the upper bead has been sufficiently started into the drop center to make the downward thrust component less important; but the deflectors have encountered much resistance. This is eased by shifting the upper sidewall transversely to the right; the shift of its mass exerts tension on the bead portion within the drop center, as taught in my prior patent.

Hence, at this stage I substantially increase the horizontal component of the thrust force sufficiently to buckle the upper sidewall radially inward, and displacing a greater part of it to the other side of center of the rim. This draws and holds the upper bead out of round. While so holding it, I cause the bead deflectors to progress over a second one-third of their arcs of travel, deflecting that portion of the bead over the upper rim flange. This operation, during the second one-third of the arcs of travel, resembles the operation shown in my U.S. Pat. No. 3,489,198; however during it there is some interference in the drop center between the lower bead and the upper bead which interferes with the fullest shift of the sidewall beyond center.

For mounting the remaining portion of the bead, it is necessary to remove the lower bead portion, at its section where the thrust is applied, from the drop center to permit the upper bead portion to enter it fully, so that the upper sidewall may reach its maximum shift beyond center. For this purpose I elevate the point of application of the thrust force while continuing its application. This causes the tire casing to twist downward and inward, at the section at which the thrust force is applied, sufficiently to draw out of the drop center that lower bead part originally within it. The upper bead portion is thus forced downward fully into the drop center, and this results in a still farther shift of the upper sidewall beyond center. This shift permits the bead deflectors to rotate into the last one-third of their arcs of travel, deflecting the tire bead portions thereat downward and into the drop center.

Figures 1, 2, 3, 4, 5, 6:
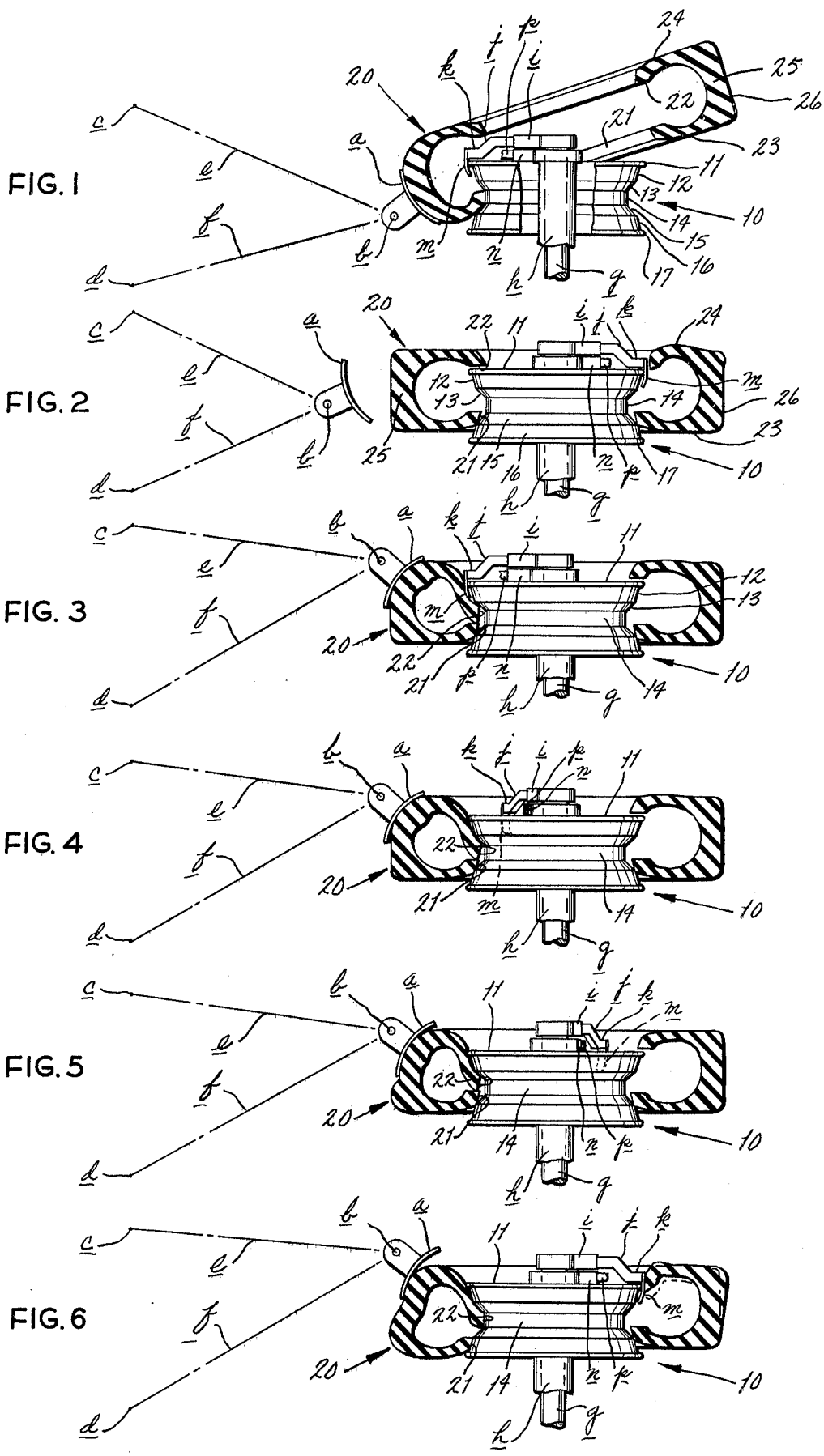
FIG. 1 is a somewhat diagrammatic view, partly in elevation and partly broken away, of a rim and counter-rotating bead deflector apparatus with a drop center rim secured thereon and a tire casing, shown in section, being thrust by the thrust shoe of the apparatus into position to start its lower bead into the drop center. The bead deflector arm at the rear of center is shown at the beginning of its stroke; that forward of center is broken away.
FIG. 2 is a view similar to FIG. 1 showing the lower bead mounted, resting below the middle of the drop center position and above the lower bead seat. The bead deflectors are at the end of their semicircular stroke, and the thrust shoe is withdrawn.
FIG. 3 illustrates the position of the bead deflectors after being returned to their original position, with the thrust shoe applied against the tread at its intersection with the upper sidewall and forcing the upper bead sharply downward into the drop center.
FIG. 4 shows the progression of the counter-rotating bead deflectors during approximately the first one-third of their deflecting stroke.
FIG. 5 shows the thrust shoe driven thereafter more sharply to the right, partly displacing the upper sidewall to the right and permitting the bead deflectors to rotate through approximately the second one-third of their strokes.
FIG. 6 shows the thrust shoe somewhat raised and thrust still farther to the right, causing that section of the casing shown at the left side of the drawing to rotate slightly, withdrawing the lower bead to its bead seat so that at that side the upper bead will enter fully into the drop center, further displacing the upper sidewall to the right and permitting the bead deflectors to complete their stroke. When they reach the position at the right side of FIG. 6, that bead portion drops downward into place, as shown in phantom lines.

The phantom lines in the left side of each illustration depict the positions of the longitudinal axis of hydraulic struts (not shown) which position the thrust shoe.

DESCRIPTION OF THE PREFERRED EMBODIMENT

The apparatus suitable for carrying out the method of the present invention has greater flexibility and maneuverability than that of U.S. Pat. No. 3,489,198. Improved apparatus for applying thrust is shown in U.S. Pat. No. 4,014,375 entitled "Thrust-Applying Mechanism for Tire Changing Apparatus" contra-rotating bead deflector mechanism, with deflectors mounted on the arms of concentric shafts, which operate without substantial frictional load, is shown in U.S. Pat. application Ser. No. 658,600 filed Feb. 17, 1976, entitled "Concentric Contra-Rotating Bead Deflector Mechanism for Tire Mounting Apparatus". Reference is made to these constructions for details of apparatus to be best utilized in carrying out the present method.

The accompanying drawings illustrate its steps schematically. Each of the drawings shows a thrust shoe $a$ which may be positioned at a selected angle about a transverse shaft $b$ whose position is determined by the independent extension and retraction of upper and lower hydraulic cylinders not shown, mounted on upper and lower hinge points $c$, $d$ along upper and lower thrust axes $e$, $f$, these axes $e$, $f$, swinging about the hinge points $c$, $d$ with the relative extension and retraction of their respective cylinders.

The counter-rotating mechanism to be used is indicated by a central inner vertical shaft $g$ and a concentric hollow outer shaft $h$, both rotated by mechanism not here shown. The central shaft $g$ rises to a level higher than that of the outer shaft $h$; its upper projecting portion mounts a fixed hollow inner arm $i$ whose hollow adjustably accommodates an outer radial arm $j$ having a downward offset end $k$ terminating in a blade type bead deflector $m$ which projects downward over and beyond the rim flange 11. The outer shaft $h$ has at its upper end, immediately below the upper inner arm $i$, a fixed hollow lower inner arm $n$ whose hollow adjustably accommodates an outer radial arm $p$ shown broken away. It will be understood that at the outer end of the arm $p$ a second similar bead deflector $m$ is attached. As seen, the outer ends of the arms $k$ and $p$ operate at the same level. This level is adjustably positioned to be immediately above that of a drop center rim generally designated 10, which is mounted, by mechanism not shown, concentric with the shafts $g$, $h$. The heights of the shafts $g$, $h$, and the positions thereon of the outer arms $j$, $p$ are adjusted so that the bead deflectors $m$ will clear the upper flange 11 of the drop center 10 when rotated.

The rim 10 is new in commercial use but its design is conventional, having below its upper flange 15 an upper bead seat portion 12 leading to a downward and inward sloping wall portion 13 which leads to the smaller diameter drop center or well portion 14. Below it, an outwardly sloping wall portion 15 leads to a lower bead seat portion 16 above a lower flange 20 by which the rim 20 is secured.

A large broad tire casing generally designated 20 is of the type used for coal and ore-carrying vehicles. It has a lower bead 21 and upper bead 22 whose inner surfaces are formed at an angle, conventionally 15°, to seat against the bead seating portions 16, 12 of the rim 10. The beads 21, 22 are at the radially inner edges of the lower and upper side walls 23, 24 which extend outward to the heavy radially outer mass 25 of the casing 20, terminating in its radially outer tread portion 26.

While the apparatus referred to is different from that shown on my U.S. Pat. No. 3,489,198, the lower bead 21 of the tire casing 20 may be mounted substantially according to the method of that patent.

Thus, as shown in FIG. 1, with the bead deflectors $m$ on the arms $j$, $p$ positioned adjacent to the point at which the thrust shoe $a$ is to be applied, the shoe $a$ is thrust upwards, forcing the lower bead 21 into and against the surface of the drop center well portion 14 and buckling the lower side wall 23 therebetween. The deflectors $m$ are then rotated in opposite senses, engaging a successively wider arc portion of the lower bead 21 and deflecting it over the upper flange 11 of the rim 10. The deflection is relatively easy because, as taught in my U.S. Pat. No. 3,489,198, buckling of the lower side wall 23 causes the mass of the tire 20 to shift beyond the central vertical axis; as it does so its mass draws the bead 23 against the surface of the small diameter drop center well portion 14, thus drawing it out of round. The bead deflectors are then actuated to progress in opposite senses around the periphery of the rim 10 through slightly less than 180° arcs, ending adjacent to each other in the position shown in FIG. 2. As there illustrated the entire lower bead 21 has been deflected over the upper rim 11, to come to rest at a level near the intersection of the lower sloping wall portion 15 and the lower bead seat portion 16 of the rim. The deflector arms are then rotated back from the FIG. 2 position to the original position adjacent to each other as seen in FIG. 3. In the course of this rotation the deflectors m ride against that portion of the upper bead 22 adjacent to the left side of the drawing, driving it to the left from the position shown in FIG. 2.

Although the radially inner surfaces of the beads 21, 22 are shaped to fit on the bead seat portions 16, 12 of the rim 10, they will not do so in use until the casing 10 is expanded or inflated. Meantime a substantial part of the lower bead 21 will remain in the drop center portion 14 of the rim 10 and will hold the upper bead 22 elevated, usually above the upper rim flange 11. The continued presence of part of the lower bead 21 in the region of the drop center 14 interferes with the insertion of the upper bead therein, giving rise to a need for the new method of the present invention.

In using the present method, the thrust shoe a is elevated, and rotated about the axis b to a downward and inward facing position. The shoe a is then thrust downward and to the right, to press against a localized area of the tread 26 of the tire adjacent to its upper side wall 24, the thrust force having a radially horizontal component but also having a strong downward component, sufficient to thrust a portion of the upper bead, at the section shown at the left side of FIG. 3, downward below the upper rim flange 11 at least partly below the upper bead seat area 12, and into the drop center portion 14. The downward component of the force, required to thrust the portion of the upper bead 22 down over the bead deflectors m and into the FIG. 3 position, is large, and until some greater portion of the bead 22 can be deflected over the rim 11, it is not feasible to shift the mass of the tire substantially to the right. Accordingly, even before such shift, the arms i, n are rotated to pass the bead deflectors m around the rim flange 11 over about the first one-third of their arcs of travel. The thrust shoe a is held in the FIG. 3 position until this stage of rotation has been completed, as shown in FIG. 4.

At this stage it is important to commence shifting the upper side wall 24 substantially to the right, and by the accompanying shift of mass of the tire, exert a tension on the portion of the upper bead 22 within the drop center 14 to draw it tightly against the distributed resistance there offered and pull it out of round. To achieve it, the horizontal component of the thrust force on the thrust shoe a is increased sufficiently to further buckle that portion of the upper side wall 24 between the localized area of force application and the portion of the bead 22 there inserted into the drop center. This step, which is analogous to the teaching of my patent first referred to, is somewhat impeded by the presence within the drop center 14 of a part of the lower bead 21 as seen in FIGS. 3, 4 and 5.

Despite this interference, the bead deflectors are rotated through substantially the second one-third of their arcs of travel, progressively deflecting the upper bead 22 over the rim flange 11 to about the position shown in FIG. 5.

To complete deflecting the upper bead 22 over the flange 11, this interference must be eliminated. To do so the point of contact of the thrust shoe a with the tire casing 20 is elevated, to the level shown in FIG. 6, while continuing the application of the thrust force. This elevation of the point of thrust application, accompanied by gradually moving it further to the right, causes the tire casing 20 to twist downward and inward at the section shown in the left of FIG. 6. This twist is sufficient to draw downward from the drop center portion 14 of the rim that part of the lower bead 21 which interferes with the upper bead 22. The results are that the thrust force on the upper bead 22 drives it fully into the drop center 14. The upper side wall 24 shifts farther beyond center, drawing the bead 22 tightly against its surface and so distorting it out of round that the bead deflectors may progress through the final portion of their arcs of travel, as shown at the right side of FIG. 6. When the bead deflectors reach the portion there shown, the inner sloping surface of the bead 22 will ride downward along the curved face of the bead deflectors m, as shown in phantom lines, to fit below the upper rim flange 11.

When the hydraulic thrust cylinders are retracted along the axes e, f to withdraw the shoe a, the outer radial arms j, p may be removed from the hollow inner arms i, n. The rim 10 with the casing 20 thereon may then be removed from the apparatus and inflated, to cause the beads 21, 22 to seat onto the bead seat portions 12, 16.

Using the type of apparatus described, this procedure has successfully solved the problem of fitting the upper bead 22 over the rim flange 11. This problem was heretofore much greater than fitting the lower bead 21; and I have discovered that where the capacity of the apparatus is somewhat greater than required for fitting the upper bead alone, the lower bead may, if desired, be fitted at the same time. To do so, the upper and lower beads are simultaneously pressed as far as possible into the drop center, and the steps heretofore described for the first and second portions of the arcs of bead deflector travel are carried on. While they are rotated, the lower bead portions 21 will shift over the flange 11 just in advance of the overlying portions of the upper bead 22. To carry out this simplified procedure, the thrust shoe a is originally manipulated, both as to its position of contact with the tire casing 20 and its angle with reference to the transverse shaft b, originally being closer to center than is shown in FIG. 3 and not directed downward to the same extent; this results in even greater interference by the lower bead 21 with the upper bead 22, which interference continues as the deflectors move to the FIG. 4 position and thereafter to the FIG. 5 position. However, on elevating the thrust shoe a to the level shown in FIG. 6 and continuing the horizontal component of thrust, the casing will twist as shown, the lower bead portion withdrawing itself from the drop center to the FIG. 6 position, permitting the completion of the rotation of the bead deflectors to the final one-third of their arcs of travel as heretofore described.

While the present process as described correlates the changes of position of the thrust shoe with what has been described as three stages of partial rotation of the bead deflectors, this disclosure will be recognized, by persons familiar with mounting tires, as being a description of the underlying operating principles and will suggest to them certain obvious modifications in the positioning of the thrust shoe and in the stages of partial rotation of the bead deflectors. For example, the operator may, at his option, divide the operation into more distinct steps, or with increasing familiarity with the machine, cause the steps to merge smoothly with each other, rotating the bead deflectors more or less simultaneously with the movements by which the position of the thrust shoe a is shifted. Accordingly, the references in the claims which follow to the succession of the steps described is to be understood as including such suggested variations. It will be further understood that the defined steps of the process may be performed with apparatus other than that specifically described.

I claim:

1. In the use of that type of tire mounting maching which mounts a tire casing on a horizontally secured rim having upper and lower flanges, annular bead seating areas inwardly adjacent to said flanges, and a sloping-walled drop center portion therebetween, the machine being of the type in which two counter-rotating bead deflectors, rotated from within the rim about such upper flange, commence adjacent to each other and rotate through nearly semi-circular arcs of travel in opposite senses, the method, utilized when the tire lower bead is at least partially in the drop center portion, of mounting the tire upper bead over the rim upper flange, comprising the steps of (a) positioning said bead deflectors adjacent to each other at a selected point along the circumference of the rim;

(b) applying, radially outward of said point against a localized area of the tread of the tire adjacent to its upper sidewall, a thrust force having a radial horizontal component and a downward component, whereby to thrust a portion of the upper bead, inward of such localized tread area, downward below the upper flange of the rim and at least partly adjacent to the lower bead part therein into its drop center;

(c) commencing the counter-rotation of said bead deflectors to deflect the upper bead from above to below the upper rim flange in an arc widening progressively from said selected point during substantially the first one-third of their said arcs of travel;

(d) then increasing the horizontal component of the thrust force sufficiently to so buckle the said upper sidewall portion between said localized area and bead as to displace and thereby shift a greater part of the upper sidewall to the other side of center of the rim;

(e) causing said bead deflectors to progressively deflect said bead over the upper rim flange during substantially the second one-third of their said arcs of travel; and then (f) elevating the point of application of said thrust force and moving same radially further inward, whereby to cause the tire casing to twist downward and inward at the section at which the thrust force is applied, sufficiently to draw out of the drop center the lower bead part theretofore therein and press the upper bead portion fully into the drop center thereat, thus to permit the upper sidewall to shift farther beyond center; and (g) continuing the progression of the bead deflectors during the final portion of their arcs of travel, whereby to complete the bead deflection over the upper flange of the rim.

2. In the use of that type of tire mounting machine which mounts a tire casing on a horizontally secured rim having upper and lower flanges, annular bead seating areas inwardly adjacent to said flanges, and a sloping-walled drop center portion therebetween, the machine being of the type in which two counter-rotating bead deflectors, rotated from within the rim about such upper flange, commence adjacent to each other and rotate through nearly semi-circular arcs of travel in opposite senses, the method of mounting the upper and lower tire beads simultaneously, comprising the steps of (a) positioning said bead deflectors adjacent to each other at a selected point along the circumference of said rim;

(b) applying radially outward of said selected point against a localized area of the tread of the tire such a thrust force as to thrust portions of both the lower and upper beads, inward of such localized tread area, downward below the upper flange of the rim and together into its drop center;

(c) commencing the counter-rotation of said bead deflectors to deflect successive portions of the lower bead and thereafter the overlying portions of the upper bead from above to below the upper rim flange in an arc widening progressively from said selected point during substantially the first one-third of their said arcs of travel;

(d) then applying more horizontal thrust force sufficiently to displace and thereby shift a greater part of the casing to the other side of center of the rim;

(e) causing said bead deflectors to progressively deflect the upper and lower beads over the upper rim flange during substantially the second one-third of their said arcs of travel;

(f) elevating the point of application of said thrust force and moving same radially further inward, whereby to cause the tire casing to twist downward and inward at the section at which the thrust force is applied, sufficiently to draw out of the drop center the lower bead part thereat and press the upper bead portion fully into the drop center thereat, thus to permit the upper sidewall to shift farther beyond center; and (g) continuing the progression of the bead deflectors during the final portion of their arc of travel, whereby to complete the bead deflection over the upper flange of the rim.

* * * * *